US009528632B2

(12) United States Patent
Glaun

(10) Patent No.: US 9,528,632 B2
(45) Date of Patent: Dec. 27, 2016

(54) TORTUOUS PATH CONTROL VALVE TRIM

(71) Applicant: General Electric Company, Schenectady, NY (US)

(72) Inventor: Jeremy Asher Glaun, Sharon, MA (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 81 days.

(21) Appl. No.: 14/513,303

(22) Filed: Oct. 14, 2014

(65) Prior Publication Data

US 2016/0102781 A1 Apr. 14, 2016

(51) Int. Cl.
| | |
|---|---|
| F16K 47/04 | (2006.01) |
| B23K 26/00 | (2014.01) |
| F16K 47/08 | (2006.01) |
| B33Y 10/00 | (2015.01) |
| B33Y 80/00 | (2015.01) |

(52) U.S. Cl.
CPC .......... *F16K 47/04* (2013.01); *B23K 26/0006* (2013.01); *B23K 26/342* (2015.10); *F16K 47/08* (2013.01); *B33Y 10/00* (2014.12); *B33Y 80/00* (2014.12)

(58) Field of Classification Search
CPC .. F16K 47/04; F16K 47/08; Y10T 137/86718; Y10T 137/86734; Y10T 137/86759; Y10T 137/86791; Y10T 137/86799
USPC .............. 137/625.28, 625.3, 625.33, 625.37, 137/625.38; 251/118; 138/40, 43
See application file for complete search history.

(56) References Cited

U.S. PATENT DOCUMENTS

| | | | |
|---|---|---|---|
| 3,780,767 A | 12/1973 | Borg | |
| 3,856,049 A | 12/1974 | Scull | |
| 3,899,001 A | 8/1975 | Orme | |
| 3,977,435 A | 8/1976 | Bates | |
| 4,018,245 A | 4/1977 | Baumann | |
| 4,068,683 A | 1/1978 | Self | |
| RE32,197 E | 7/1986 | Self | |
| 5,390,896 A | 2/1995 | Smirl | |
| 6,095,196 A * | 8/2000 | McCarty | F15D 1/02 137/625.3 |
| RE36,984 E | 12/2000 | Steinke et al. | |
| 7,802,592 B2 * | 9/2010 | McCarty | F16K 47/08 137/625.3 |
| 8,336,313 B2 | 12/2012 | McMasters et al. | |

(Continued)

FOREIGN PATENT DOCUMENTS

GB 2199674 A 7/1988

OTHER PUBLICATIONS

European Search Report and Written Opinion issued in connection with corresponding EP Application No. 15189724.6 dated Mar. 9, 2016.

(Continued)

*Primary Examiner* — Michael R Reid
(74) *Attorney, Agent, or Firm* — Cooper Legal Group, LLC

(57) ABSTRACT

A valve component for controlling fluid flow comprises a body having a first surface and a second surface. At least one tortuous flow channel extends between the first surface and the second surface. The flow channel is at least partially defined by a floor portion and a ceiling portion. The body is formed as one-piece by additive manufacturing to concurrently define the flow channel as a void space. At least one of the floor portion and ceiling portion is disposed at an acute angle relative to a plane containing a layer of material forming the body.

15 Claims, 7 Drawing Sheets

(56) References Cited

U.S. PATENT DOCUMENTS

2005/0199298 A1  9/2005  Farrington
2007/0240774 A1  10/2007  McCarty
2009/0183790 A1  7/2009  Moore

OTHER PUBLICATIONS

"100DHP™ CCI DRAG® Control Valve for High Pressure Turbine Bypass" CCI-Turbine-Bypass-Drag Brochure, pp. 1-12, 2008.
Emerson Process Management, Fisher® WhisperFlo® Trim Brochure, "Technology that quiets control valve noise," 2006.
Dresser Masoneilan Brochure, "Integrated Smart Engineered Best Fit Solutions", Energy Management Trim, 2010.
Koso Hammel Dahl Brochure, "Velocity Control Trim for Koso Hammel Dahl Valves," 2010.

* cited by examiner

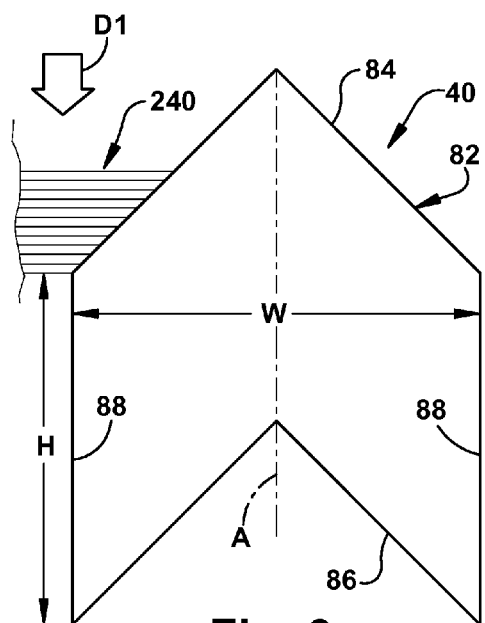
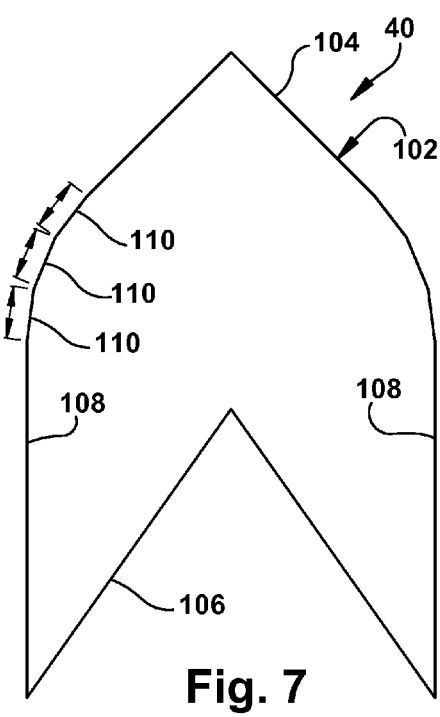
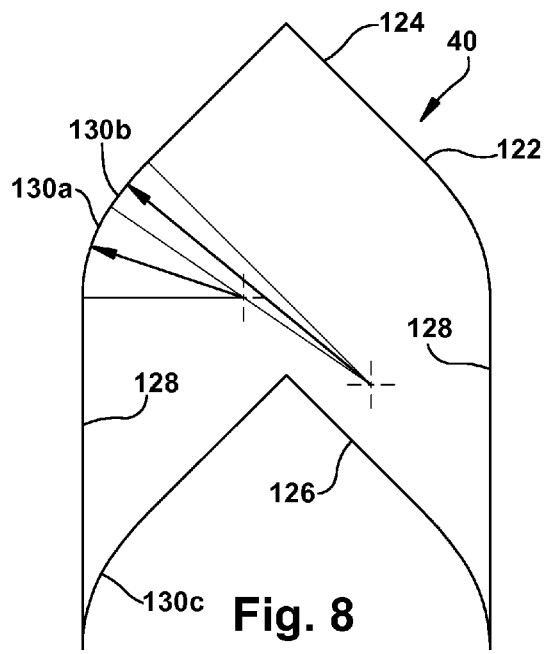

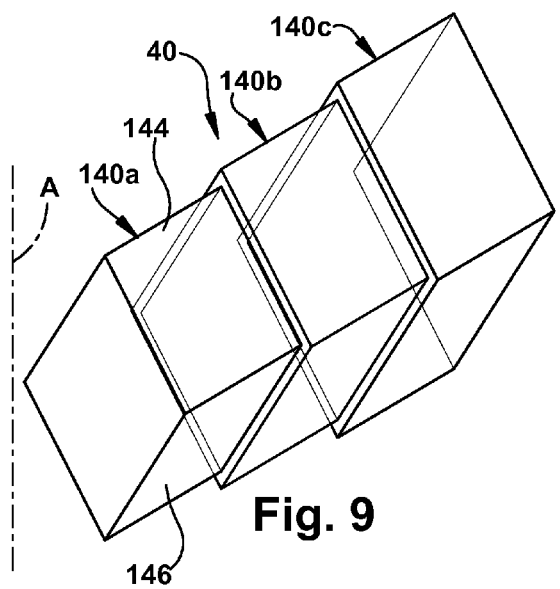
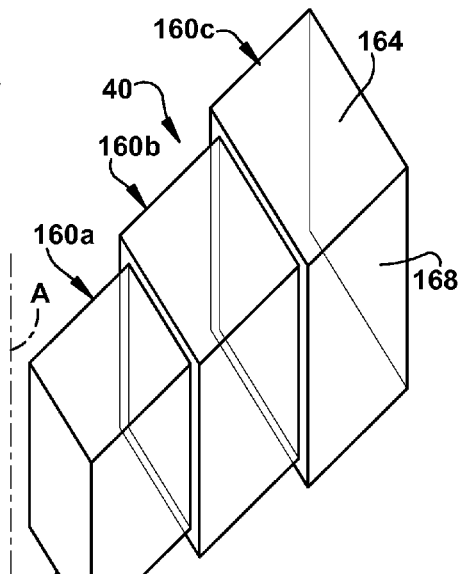
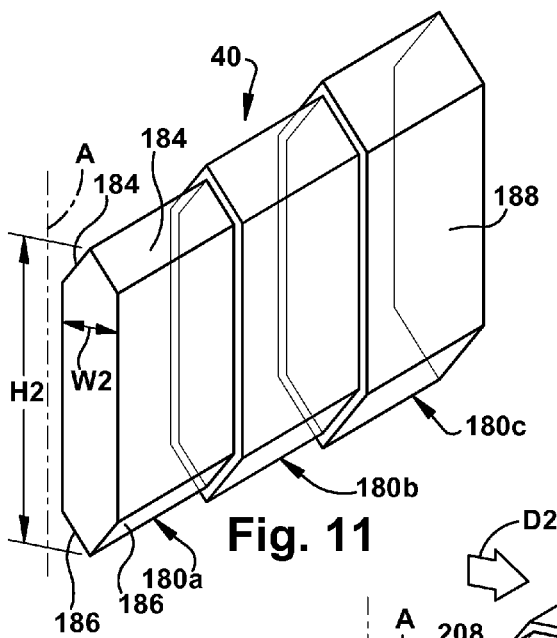
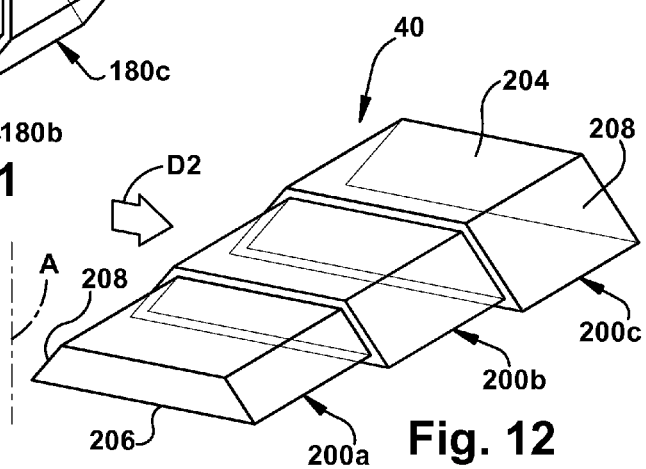

TORTUOUS PATH CONTROL VALVE TRIM

BACKGROUND OF THE INVENTION

Field of the Invention

The present invention generally relates to apparatus that control fluid flow. Particularly, the present invention relates to an improved component of a fluid flow control valve and to manufacturing the component.

Discussion of Prior Art

It is known that some fluid flow applications have valve assemblies to control fluid flow through the valve assemblies so as to minimize noise, vibration and cavitation. One such known valve assembly includes a tubular cage that fluid flows through. The cage has multiple flow channels through which the fluid flows and that are designed to control the velocity and pressure of the fluid through the cage and valve assembly.

The cage of the valve assembly is typically made from a series of stacked and relatively thin (about an average 0.125 inch thickness) cylindrical plates. The cage has numerous inlets and outlets formed along concentric circular peripheral surfaces of the plates. Flow channels are formed in the plates between the inlets and outlets by machining or cutting so flow is directed in the radial and circumferential directions within a given plate. The plates are stacked in a specific relative orientation and typically attached together by brazing.

Trying to manufacture a high quality known cage stack of plates in a reasonable lead time for a reasonable cost has been a challenge. There are inherent problems and disadvantages with manufacturing the known cage having a stack of plates.

For example, machining or stamping the plates can introduce unwanted debris that may attach to a plate or create edge surfaces that require deburring. Proper repeated stacking and aligning the separate plates can be difficult. It can also be a challenge to then hold the stacked and aligned plates during the brazing operation in order to achieve a good quality braze every time. One such alignment scheme is to provide extra material lobes with alignment holes which are machined off after brazing and, therefore, add manufacturing lead time and cost. This machining can also introduce unwanted contaminants the can enter flow channels, so care must be taken to block the flow channels or remove the contaminants.

Brazing itself also may present problems. Braze may be applied to the plates in various ways. To achieve an even and relatively thin layer of molten braze between adjacent plates, the plates must be flat. Any waviness of the plates will create areas where the braze will have difficulty flowing in an even and relatively thin manner to properly adhere adjacent plates together and, thereby, cause a lack of structural integrity. Plates can be ground flat but so doing increases manufacturing lead time, cost and the possible introduction of unwanted contaminants.

The known stacked plate-type cage manufacturing process generally requires that the cylindrical inside surface of the stack of brazed plates be machined to achieve the precision diameter and finish required to fit other components of the valve assembly. Machining the inside surface of the known cages can generate unwanted contaminants that can find their way into flow channels. It is very difficult to remove the contaminants and time consuming and costly to take measures to try to prevent ingress of the contaminants.

Thus, a need exist for an improved cage structure that does not suffer from the disadvantages and drawbacks of known plate-type of cages and the manufacturing processes used to produce them.

BRIEF DESCRIPTION OF THE INVENTION

The following summary presents a simplified summary in order to provide a basic understanding of some aspects of the arrangements and/or methods discussed herein. This summary is not an extensive overview of the arrangements and/or methods discussed herein. It is not intended to identify key/critical elements or to delineate the scope of such arrangements and/or methods. Its sole purpose is to present some concepts in a simplified form as a prelude to the more detailed description that is presented later. This summary is not intended to be used to limit the scope of the claimed subject matter.

A valve component cage for controlling fluid flow, according to one aspect, comprises a body having a first surface and a second surface. At least one tortuous flow channel extends between the first surface and the second surface. The flow channel is at least partially defined by a floor portion and a ceiling portion. The body is formed as one-piece by additive manufacturing to concurrently define the flow channel as a void space. At least one of the floor portion and ceiling portion is disposed at an acute angle relative to a plane containing a layer of material forming the body.

A trim cage for controlling fluid flow, according to another aspect, comprises a unitary body having a substantially tubular configuration with a longitudinal central axis. The body has an inner surface and an outer surface. At least one tortuous flow channel extends through the body from the inner surface to the outer surface for fluid flow therethrough. The tortuous flow channel includes at least two sections. Each section of the flow channel is offset relative to an adjacent section. Each section of the flow channel has an axial floor portion and axial ceiling portion. Each of the axial floor portions and axial ceiling portions are disposed at an acute angle relative to a plane extending normal to the longitudinal central axis of the body.

A method of manufacturing a unitary trim cage, according to yet another aspect, comprises the steps of providing material to define a closed body base with an inner opening surface and an outer surface. Material is added to the body base along a lay down direction and in such a manner to maintain the inner opening surface and define at least one tortuous flow channel extending between the inner opening surface and the outer surface. The tortuous flow channel includes of a plurality of sections. Each section of the flow channel is offset relative to an adjacent section. The surfaces defining the flow channel are accomplished without internal support. At least a portion of each section extends at an acute angle relative to direction of additive lay down. Material is added to define a closed body cap in such a manner to maintain the inner surface and the outer surface.

BRIEF DESCRIPTION OF THE DRAWINGS

The following description and drawings set forth certain illustrative embodiments, aspects and implementations. These are indicative of but a few of the various ways in which one or more aspects may be employed. Further features of the invention will become apparent to those skilled in the art to which the invention relates from reading the following description with reference to the accompanying drawings, in which:

FIG. 6 is an enlarged view of the cross-sectional shape of the flow channel according to one aspect;

FIG. 7 is an enlarged view of the cross-sectional shape of the flow channel according to another aspect;

FIG. 8 is an enlarged view of the cross-sectional shape of the flow channel according to yet another aspect;

FIG. 9 is an enlarged perspective view of an alternative flow channel shape according to another aspect;

FIG. 10 is an enlarged perspective view of an alternative flow channel shape according to another aspect;

FIG. 11 is an enlarged perspective view of an alternative flow channel shape according to another aspect; and FIG. 12 is an enlarged perspective view of an alternative flow channel shape and manufacturing process according to yet another aspect.

DETAILED DESCRIPTION OF THE INVENTION

Figure 1:
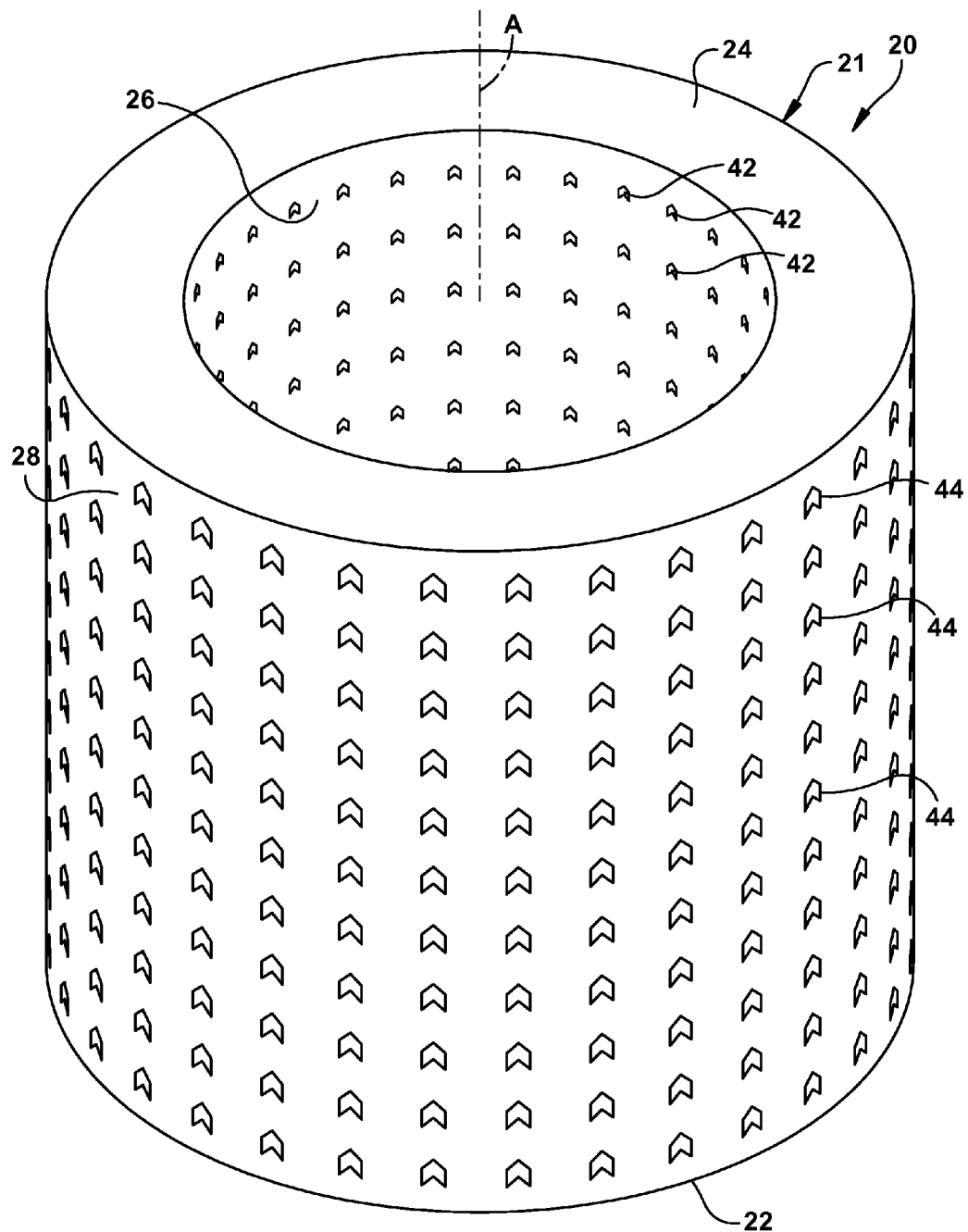
FIG. 1 is an overall perspective view of a trim cage, constructed according to one aspect.

The claimed subject matter is described with reference to the drawings, in which like reference numerals are used to refer to like elements throughout the description. In the following detailed description, for purposes of explanation, numerous specific details are set forth in order to provide an understanding of the claimed subject matter. It will be understood, however, that the claimed subject matter can be practiced without these specific details.

An improved control valve component, such as a trim cage and method of manufacturing the trim cage are disclosed that do not suffer from the disadvantages and drawbacks of previously known stacked plate-type cages and their associated manufacturing processes. The improved trim cage has a plurality of flow channels with a specific configuration that allows the control valve to be "printed" by a direct metal laser melting process to define the flow channels as void spaces without the need for internal support. Direct metal laser melting is an additive manufacturing technique that uses a laser as the power source to sinter powdered material (typically metal), aiming the laser automatically at points in space defined by a 3D model, binding the material together to create a solid structure.

The improved trim cage is used in a control valve assembly (not shown). In addition to the improved trim cage, the control valve assembly includes a valve body, a cage retainer and a valve plug. The valve body has an inlet, an outlet, and a conduit extending between the inlet and the outlet. The trim cage is a generally cylindrical member that has a plurality of flow channels and is disposed within the conduit. The cage retainer holds the cage in the valve body within the conduit of the valve body. The valve plug closely fits within the trim cage and is movable relative to the trim cage. The valve plug is adapted to be coupled to an actuator. The actuator controls reciprocal displacement of the valve plug between a closed position and an open position. Upon movement of the valve plug towards the open position, fluid is free to flow through the plurality of flow channels in the trim cage.

An improved trim cage 20, according to one aspect for use in the control valve assembly, is illustrated in FIG. 1. The trim cage 20 has a body 21 with a substantially tubular shape with a longitudinal central axis A. The body 21 is formed as a unitary or one-piece component which provides advantages over previously known stacked plate-type cages. The trim cage 20 includes a base 22 defining the lower end of the body 21, as viewed in FIG. 1. The trim cage 20 also includes a cap 24 at the upper end. The body 21 of the trim cage 20 has a cylindrical inner surface 26 disposed about the longitudinal axis A and extends between the base 22 and cap 24. The body 21 of the trim cage 20 also has a cylindrical outer surface 28 that is coaxial with the inner surface 26 and extends between the base 22 and cap 24.

As best seen in FIGS. 2-5, the trim cage 20 has a plurality of tortuous flow channels 40 extending through the body 21 and between the inner surface 26 and the outer surface 28. The flow channels 40 are formed in a columnar and circumferential array as void spaces as the body 21 is being manufactured. The body 21 is integrally formed as one-piece by successive layer material additive manufacturing, or simply additive manufacturing, that defines the flow channels as void spaces within the body during manufacture. The flow channels 40 are formed during the manufacture of the body 21 without the need of support material to define the flow channel.

While sixteen columns and eleven circumferentially arranged rows of flow channels 40 are illustrated in the trim cage 20, it will be apparent that any suitable number of columns and circumferentially arranged rows of flow channels may be utilized. For example, it is contemplated that the number of flow channels 40 formed in the trim cage 20 could be in the range of between one hundred to several thousand or more depending on the size of the trim cage, size of the valve assembly that the trim cage is used in and the volume of fluid that will flow through the trim cage and valve assembly. Also, there are certain trim cages that contain a relatively small number of plates for a short distance of the valve travel and even other styles of valve trim. These trim cages could very few flow channels (e.g., as few as 2 flow channels).

Each of the flow channels 40 has an inlet 42 (FIGS. 2-5) at the inside of the trim cage 20 at the inner surface 26. Each of the flow channels 40 also has an outlet 44 at the outside of the trim cage 20 at the outer surface 28. The direction of fluid flow F (see FIG. 5) in the flow channels 40 is generally in a radially outward direction from the inner surface 26 through inlet 42 to the outer surface 28 through the outlet 44 (see FIG. 3). Each flow channel 40 (see FIG. 5) forms a labyrinth structure that causes fluid to flow in a tortuous path. In the illustrated example, the flow path F essentially varies or changes direction that is substantially parallel to the longitudinal central axis A of the trim cage 20 at least for a portion of the flow channel 40. The flow channel 40 may be formed, if desired, so that it directs flow in a direction substantially parallel to the longitudinal central axis A for a distance that is greater than previously possible with the stacked plate-type cages. That is, since the plate was typically only about 0.125 inch in thickness the flow path F can be designed so that flow is directed for an axial distance that is greater than what could be done with stacked plate-type cages. It will be apparent that the flow channel 40 can be formed so that the flow path can be customized to flow in any desired direction. For example, the flow channel 40 may be designed to flow in a partially circumferential direction, either in a substantially arcuate or linear flow direction, for at least a portion of the flow path. It will also be apparent that the flow path could be a combination of axial and circumferential flow.

The size and configuration of each of the flow channels 40 may be depend on the fluid flowing therethrough. For example, if an incompressible fluid, such as a liquid, is flowing through the trim cage 20, the cross-sectional area of the flow channels 40 will be substantially constant as it extends from the inlet 42 to the outlet 44. By way of example for incompressible liquid flow, the cross-sectional area of the flow channel 40 is illustrated in FIG. 6, according to one aspect, and will be substantially the same for the entire length of the flow channel 40. The height H of an inlet 42 of the flow channel 40 can be about 0.125 inch and the width W can be about 0.125 inch. The height H of an outlet 44 of the flow channel 40 having a gas flow therethrough can be about 0.125 inch and the width W can be about 0.125 inch. Any suitable dimensions for the height H and width W can be used. It will also be apparent that a flow channel 40 with a single inlet 42 and a single outlet 44 could be used as opposed to the bifurcated flow channel with a pair of outlets, as illustrated in FIGS. 4 and 5.

For example, if a compressible fluid, such as a gas, flows through the trim cage 20, the cross-sectional area of the flow channels 40 may increase in the direction of flow from the inlet 42 to the outlet 44. For example, the cross-sectional flow area of the flow channels 40 may increase in size by a factor of two or more. By way of example for gas flow, the cross-sectional area of the flow channel 40 is illustrated in FIG. 6. The height H of the flow channel 40 of an inlet 42 can be about 0.125 inch and the width W can be about 0.125 inch. The height H of each outlet 44 of the flow channel 40 having a gas flow therethrough can be about 0.25 inch and the width W can be about 0.25 inch. It is to be appreciated that any suitable dimension can be used.

Figure 2:
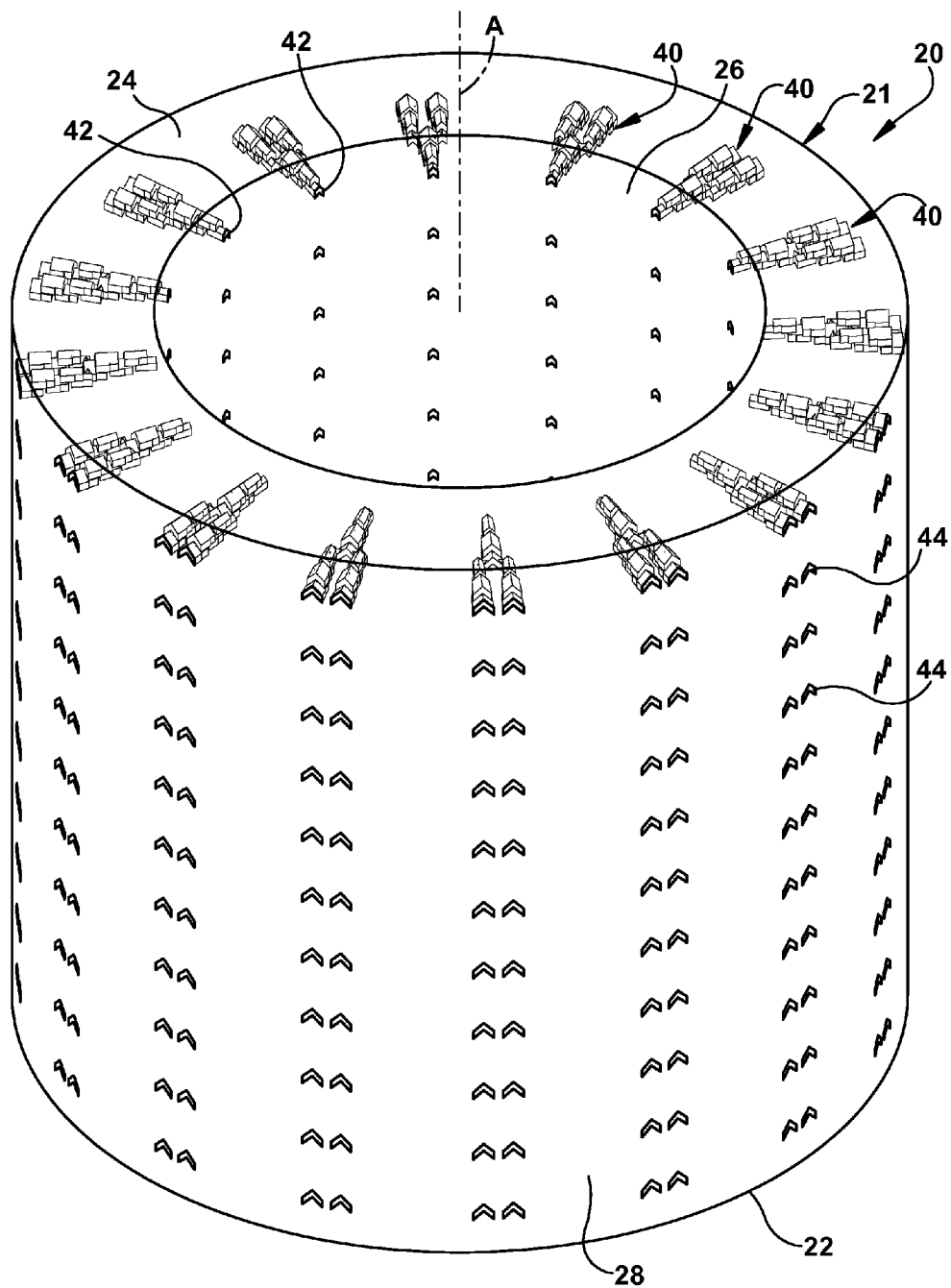
FIG. 2 is a perspective view of the trim cage, similar to FIG. 1, partly in phantom to show some flow channels dispersed throughout the trim cage.
Figure 3:
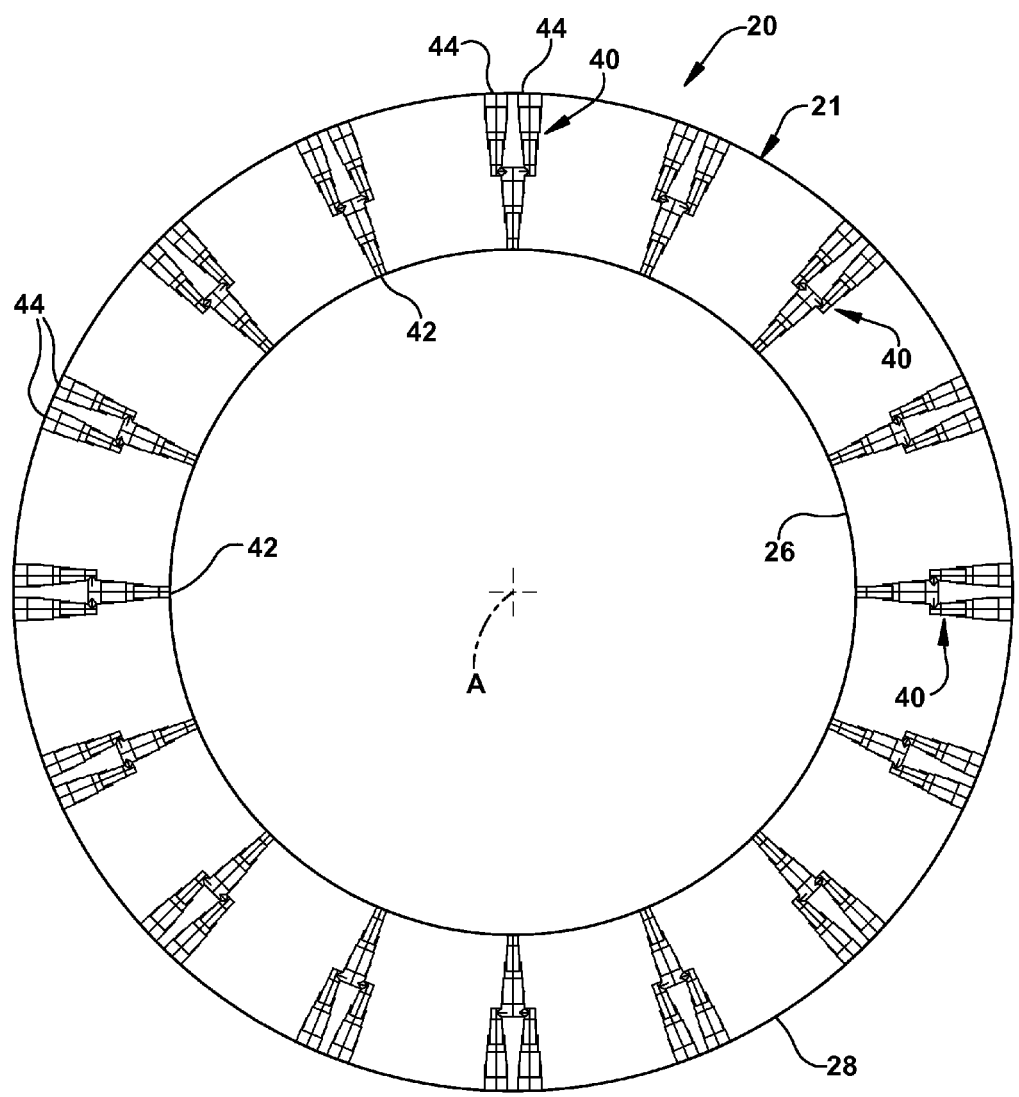
FIG. 3 is a top view of the trim cage, illustrated in FIG. 2, showing the flow channels.
Figure 4:
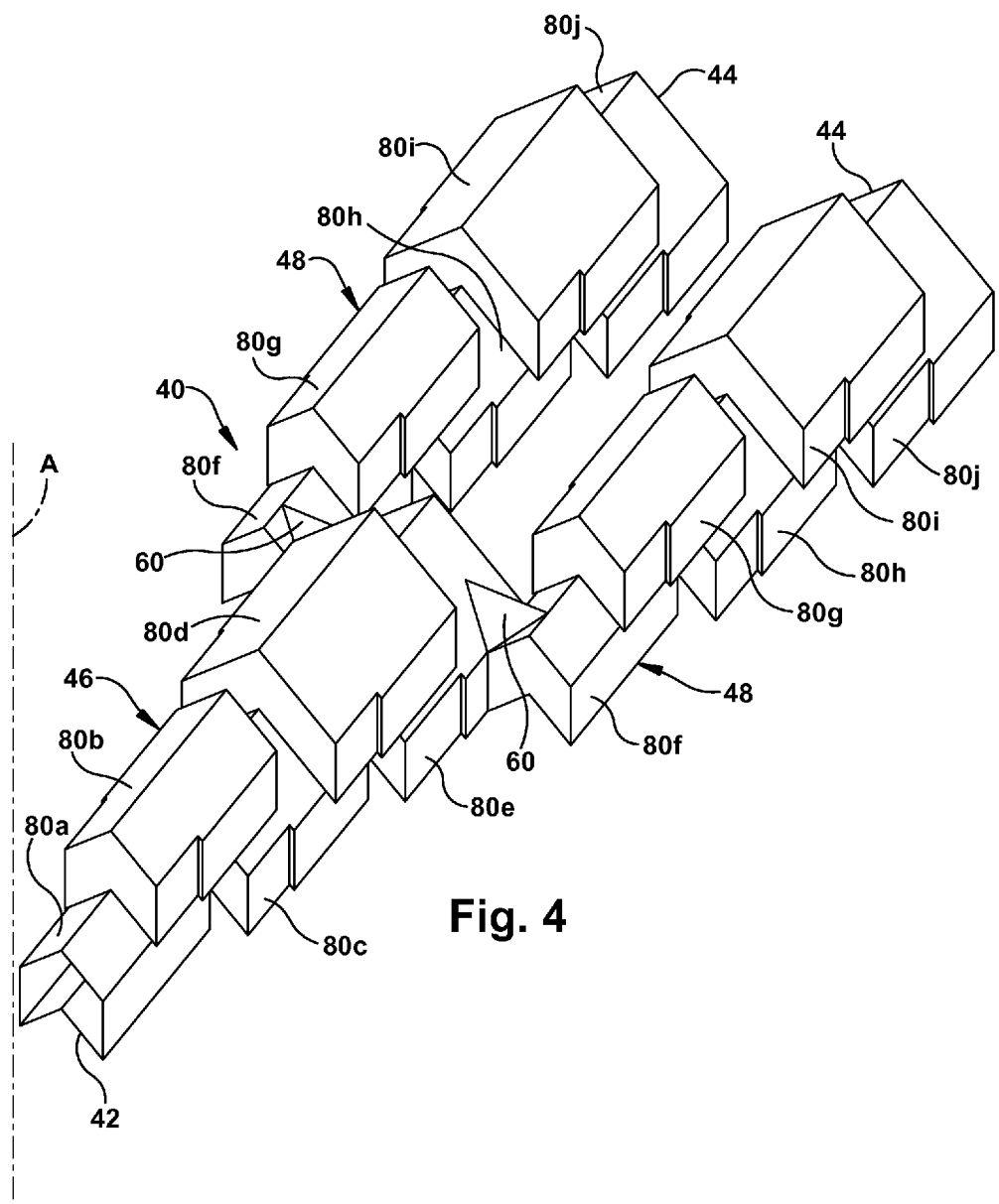
FIG. 4 is an enlarged perspective view of one of the flow channels in the trim cage illustrated in FIGS. 1-3.

As illustrated in FIGS. 2-4, each of the flow channels 40 for use with gaseous flow applications has an inlet or primary flow channel portion 46 and a bifurcated or pair of secondary flow channel portions 48 extending from the primary flow channel portion 46 of the flow channel. Each of the secondary flow channel portions 48 is connected to the primary flow channel portion 46 by respective substantially circumferentially extending connecting portion 60. In this aspect, the overall cross-sectional flow area at the outlets 44 of the flow channel 40 can be four or more times the cross-sectional flow area at the inlet 42 by the width W increasing while the height H remains relatively constant. The connecting portions 60 are arranged to direct fluid flow in an orthogonal direction relative to the radial extent from the primary flow channel portion 46.

Figure 5:
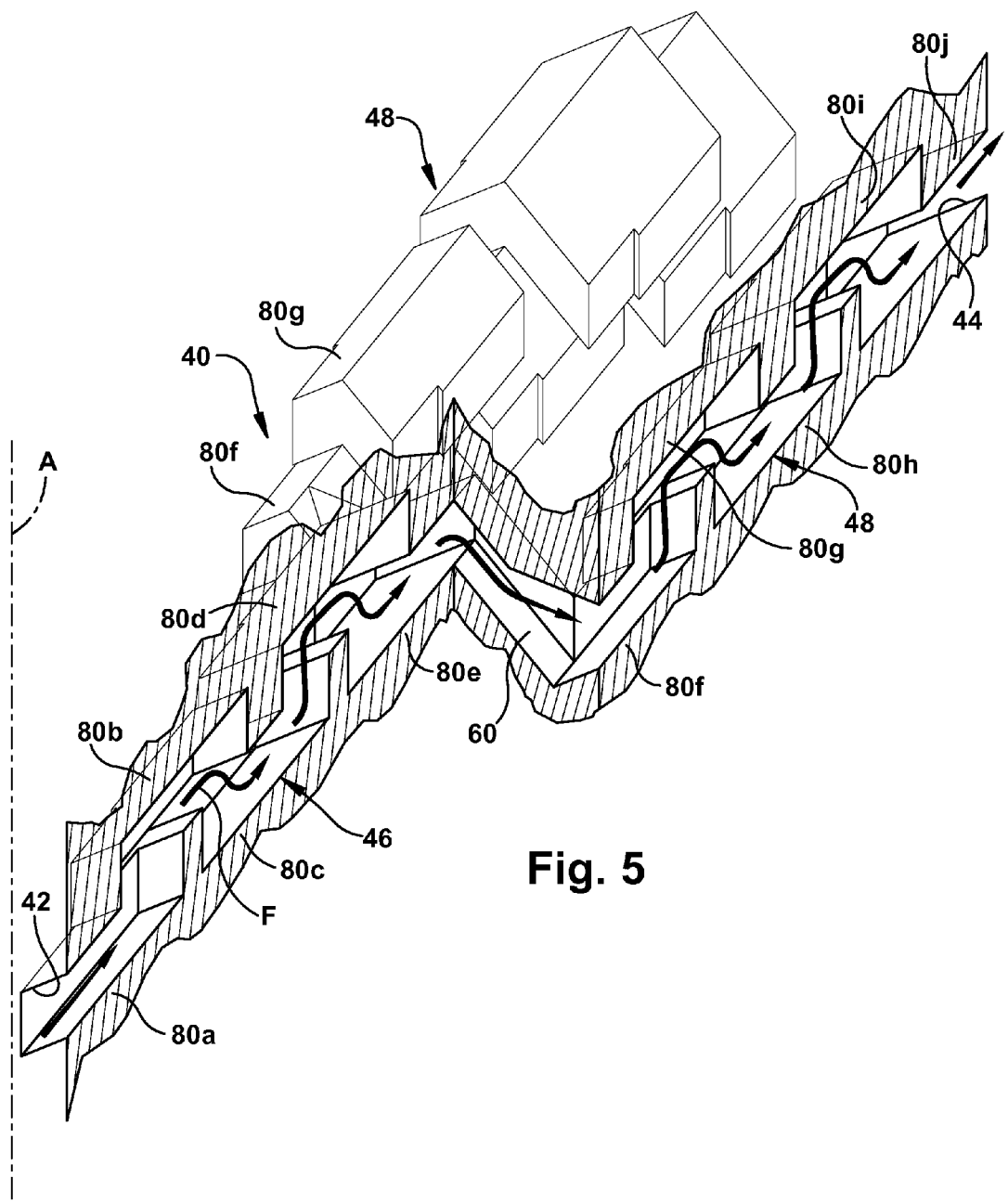
FIG. 5 is a perspective view partly in section of the tortuous flow path in the flow channel illustrated in FIG. 4.

Each flow channel 40 also includes a plurality of sections 80a-80j (FIGS. 4-5). The exact number of sections 80a-80j in a given flow channel 40 will depend on numerous variables, such as the size of the trim cage 20, the fluid that will flow therethrough, the cross-sectional flow area of the flow channel and the length of the flow channel. It is worth noting that the primary driver for the number of sections is actually the pressure drop across the stack. The number of sections 80a-80j that are illustrated in FIG. 4 are by way of example. Sections 80a-80e comprise the inlet or primary flow channel portion 46. Sections 80a-80j comprise each of the outlet or secondary flow channel portions 48.

The sections 80a-80j are alternating offset in the axial direction along the axis A relative to one another. For example, section 80b is located a predetermined distance above section 80a and the section 80c is then located a predetermined distance below section 80b, as illustrated in FIGS. 4 and 5. The center of the sections 80a and 80c can be located along a first line extending radially from the longitudinal central axis A. The center of the sections 80b and 80d can be located along a line extending radially from the longitudinal central axis A. The first radially extending line can be spaced from the second radially extending line in a direction substantially parallel to the longitudinal central axis A. This alternating pattern repeats itself for the entire length of the flow channel 40 and forms the labyrinth structure to create the tortuous flow path F of the flow channel 40 as illustrated in FIG. 5. It will also be apparent that the sections 80a-80j could be offset in a circumferential alternating and repeating direction relative to one another.

As illustrated in FIG. 6, the cross sectional shape of the flow channel 40 is in the general form or shape of a chevron 82. That is the chevron 82 shape has a V-shaped roof or ceiling portion 84 and a V-shaped floor portion 86. Each leg of the ceiling portion 84 and floor portion 86 are actually planar surfaces extending in the direction of fluid flow F for a predetermined distance. The ceiling portion 84 and the floor portion 86 are joined together by substantially parallel extending planar surfaces 88. The surfaces 88 extend generally in the direction of the longitudinal central axis A of the trim cage 20. The legs of the ceiling portion 84 and floor portion and axial ceiling portion 86 of the flow channel 40 are a pair of planar surfaces that intersect at an acute angle relative to one another. Each of the surfaces of the legs of the ceiling portion 84 and floor portion 86 are also disposed at an angle relative to a plane extending normal to the longitudinal central axis A of the body 21. The angles that the legs of the ceiling portion 84 and the legs floor portion 86 are disposed do not necessarily have to be the same angle. It is the angled surfaces of the legs of the ceiling portions 84 and the legs floor portions 86 that enable use of the direct metal laser melting manufacturing process without having to support the angled surfaces during manufacture.

The tortuous flow path F of the flow channel 40 of the trim cage 20, according to any aspect disclosed herein, subjects the fluid to inertial losses as it is redirected through each turn in the flow path. The tortuous flow geometry of the of the flow channel 40 of the trim cage 20, according to any aspect disclosed herein, creates a series of kinetic energy losses. This control of energy is highly effective for noise attenuation due to the staged control of the fluid velocity. This control is accomplished by directing the fluid through the flow channels 40 that are designed with multiple sections consisting of substantial flow path redirections and expansions.

Each of the flow channels 40 of the trim cage 20, according to any aspect, that is designed with an expansion in flow area for gaseous applications, is essential for managing velocity that would otherwise increase as the pressure is reduced across each section. The expanding area is designed to compensate for the volumetric expansion of the gas, limiting fluid velocity as the pressure is reduced. Velocity control of the flowing fluid is one of several important factors for maintaining relatively low aerodynamic noise levels within the valve assembly and trim cage 20.

A modified chevron cross-sectional shape of the flow channel 40 is illustrated in FIG. 7. The modified chevron 102 has a ceiling portion 104 and a floor portion 106. The ceiling portion 104 and the floor portion 106 are joined together by a pair of substantially parallel extending surfaces 108. The parallel extending surfaces 108 extend generally in the direction of the longitudinal central axis A of the trim cage 20. The ceiling portion 104 includes a plurality of relatively short linear sections 110 forming the lower part of each of the legs of the ceiling portion 104. Any suitable number of relatively short sections 110 may be used. This type of relatively gentler corner transition configuration for the flow channel 40 may be desirable in certain circumstances, for example to smooth flow, reduce turbulence and/or reduced stress concentrations. While the floor portion 106 is illustrated as having a pair of legs that are linear, it will be apparent that each of the legs of the floor portion could be shaped with relatively short linear sections as in the ceiling portion 104. It will also be apparent that the relatively short linear sections 110 could be utilized at the apex of the ceiling portion 104 and a floor portion 106. Each of the relatively short linear sections 110 are disposed at an acute angle, preferably at least 45°, relative to a plane extending normal to the longitudinal central axis A of the trim cage 20.

Another modification of the cross-sectional area of the flow channel 40 is illustrated in FIG. 8. The modified cross-section chevron 122 has a roof or ceiling portion 124 and a floor portion 126. The roof or ceiling portion 124 and the floor portion 126 are joined together by substantially parallel extending surfaces or walls 128. The parallel extending surfaces 128 extend generally in the direction of the longitudinal central axis A of the trim cage 20. The roof or ceiling portion 124 includes a pair of relatively short arcuate sections 130a and 130b forming the lower part of each of the legs of the roof or ceiling portion 124. It will be apparent that any suitable number of relatively short arcuate sections 130a and 130b may be used. This type of configuration for the flow channel 40 may be desirable in certain circumstances, for example to smooth flow and/or reduce turbulence. As illustrated in FIG. 8, the roof or ceiling portion 124 includes two arcuate portions 130a, 130b of different radii. Arcuate portion 130a is defined by a radius that is less than the radius of the arcuate portion 130b. The arcuate portions 130a, 130b are located at the uppermost portion of the surface or wall 128 where it starts to form the roof or ceiling portion 124. While the floor portion 126 is illustrated as each of its legs having at least one relatively short arcuate section 130c. It will be apparent that any suitable number of relatively short arcuate sections 130c may be used in each leg of the floor portion 126. It will also be apparent that relatively short linear sections 130a-130c could be utilized at the apex of the roof or ceiling portion 124 or floor portion 126. Each of the relatively short arcuate sections 130a-130c are disposed so that a tangent line taken at any location along the arcuate section extends at an acute angle, preferably at least 45°, relative to a plane extending normal to the longitudinal central axis A of the trim cage 20.

It is contemplated that the flow channel 40 may have numerous shapes and sizes in addition to the chevron-based cross-sections illustrated in FIGS. 6-8. For example, as illustrated in FIGS. 9-12, various cross-section configurations are demonstrated for non-limiting example purposes.

In FIG. 9, the flow channel 40 has a diamond shaped cross-sectional flow area. The flow channel 40, according to this aspect, includes sections 140a-140c shown for exemplary purposes as aligned in the direction of flow. It will be apparent that the sections 140a-140c may be of different sizes and offset relative to one another either in the direction of the longitudinal central axis A of the trim cage 20 and/or in a direction transverse to the longitudinal central axis or a combination. In any event, the flow channel 40 has a V-shaped ceiling portion 144 and a V-shaped floor portion 146. Each leg of the ceiling and floor portions 144, 146 is a substantially planar surface. The planar surfaces are disposed at an acute angle relative to a plane extending normal to the longitudinal central axis A. The angle is preferably at least 45°. The height of the flow channel 40 taken in a direction parallel to the longitudinal central axis A, in this aspect, maybe substantially equal to the width taken in a direction normal to the longitudinal central axis. It will also be apparent that the height may be greater or lesser than the width depending on design application needs.

In FIG. 10, the flow channel 40 has a rhomboidal shaped cross-sectional flow area. The flow channel 40, according to this aspect, includes sections 160a-160c shown for exemplary purposes as aligned in the direction of flow. It will be apparent that the sections 160a-160c may be of different sizes and offset relative to one another either in the direction of the longitudinal central axis A of the trim cage 20 and/or in a direction transverse to the longitudinal central axis or a combination. The flow channel has a roof or ceiling portion 164 and a floor portion 166. The ceiling and floor portions 164, 166 include substantially planar surfaces that extend parallel to each other. The planar surfaces of the ceiling and floor portions 164, 166 are disposed at an acute angle relative to a plane extending normal to the longitudinal central axis A. The angle is preferably at least 45°. The planar surfaces of the ceiling and floor portions 164, 166 are connected by parallel extending planar surfaces 168. The parallel extending planar surfaces 168 extend in a direction substantially parallel to the longitudinal central axis A of the trim cage 20. The height of the flow channel 40 taken in a direction parallel to the longitudinal central axis A, in this aspect, maybe substantially equal to the width taken in a direction normal to the longitudinal central axis. It will also be apparent that the height may be greater or lesser than the width depending on design application needs.

In FIG. 11, the flow channel 40 has an elongated hexagonal shaped cross-sectional flow area. The flow channel 40, according to this aspect, includes sections 180a-180c shown for exemplary purposes as aligned in the direction of flow. It will be apparent that the sections 180a-180c may be of different sizes and offset relative to one another either in the direction of the longitudinal central axis A of the trim cage 20 and/or in a direction transverse to the longitudinal central axis or a combination. The flow channel has a ceiling portion 184 and a floor portion 186. Each of the ceiling and floor portions 184, 186 include a substantially planar surface. The planar surfaces of the ceiling and floor portions 184, 186 are disposed at an acute angle relative to a plane extending normal to the longitudinal central axis A. The angle is preferably at least 45°. The planar surfaces of the ceiling and floor portions 184, 186 are connected by parallel extending planar surfaces 188. The parallel extending planar surfaces 188 extend in a direction substantially parallel to the longitudinal central axis A of the trim cage 20. The height H2 of the flow channel 40 taken in a direction parallel to the longitudinal central axis A, in this aspect, is substantially larger than the width W2 taken in a direction normal to the longitudinal central axis. It will also be apparent that the height H2 may be greater or lesser than the width W2 depending on design application needs. The flow channel 40 may be formed, if desired, so that the height H2 extends in a direction substantially parallel to the longitudinal central axis A for a distance that is greater than the thickness of the previously known stacked plate-type cage that was typically about 0.125 inch.

In FIG. 12, the flow channel 40 has a quadrilateral trapezoid shaped cross-sectional flow area. The flow channel 40, according to this aspect, includes sections 200a-200c shown for exemplary purposes as aligned in the direction of flow. It will be apparent that the sections 200a-200c may be of different sizes and offset relative to one another either in the direction of the longitudinal central axis A of the trim cage 20 and/or in a direction transverse to the longitudinal central axis or a combination. The flow channel has a ceiling portion 204 and a floor portion 206. Each of the ceiling and floor portions 204, 206 include a substantially planar surface of different widths that extend substantially parallel to each other. The planar surfaces of the ceiling and floor portions 204, 206 are disposed substantially normal to the longitudinal central axis A. The planar surfaces of the ceiling and floor portions 204, 206 are connected by planar surfaces 208. The planar surfaces 208 are disposed at an acute opposite angles relative to a plane extending parallel to the longitudinal central axis A. The angle is preferably at least 45°. The height of the flow channel 40 taken in a direction parallel to the longitudinal central axis A, in this aspect, is substantially less than the width. It will also be apparent that the height may be greater or lesser than the width depending on design application needs. As will be described below, in this particular aspect, the direction that the material is laid down with would be substantially in the direction indicated by the arrow D2 and different than the direction that the material is laid down in other aspects.

Thus, a unitary or one-piece trim cage 20 is provided for controlling fluid flow energy, according to several aspects, that offers significant advantages such as flexible design options, economy and ease of manufacturing relative to previously known stacked plate-type cages.

The method of manufacturing the unitary trim cage 20, according to yet another aspect, is important to producing the trim cage, economical and very flexible in its ability to quickly incorporate design changes into finished product. The unitary trim cage 20 is made as a one-piece component by a direct metal laser melting (DMLM) that concurrently defines the flow channels 40 without the need for any internal support. The method includes providing powdered metal material to define the body 21 and flow channels 40 of the trim cage 20. The body 21 is preferably in the form of a cylindrical tube with a longitudinal central axis A. The body 21 includes the base 22 (FIG. 1-2) that is essentially a flat plate with a centrally located opening. The body 21 also includes the cap 24 and located at an opposite end from the base 22. The cap 24 is also essentially a flat plate with a centrally located opening. The body 21 has a cylindrical inner opening defined by the inner surface 26 extending along the entire axially extending for the length of the body 21 and between the base 22 and cap 24. The body 21 also has the cylindrical outer surface 28 disposed coaxially about the axis A and the inner surface 26 and extending between the base 22 and cap 24.

The trim cage 20 is preferably manufactured by a suitable material additive manufacturing process. One such process is direct metal laser melting. In such a method, material is first laid down in the form of a powdered substance in a series of layers, collectively illustrated as 240 in FIG. 6, such as a suitable metal for the application. A laser then melts each layer of the laid down powder on a previous laid down layer that melted and solidified.

Flow channels 40 extend between the inner surface 26 (i.e., the inner opening) and outer surface 28. The body 21 is integrally formed as one-piece by successive layer material additive manufacturing (additive manufacturing) to define solid portions of the body and the flow channel 40 as a void space. The flow channel 40, according to one aspect illustrated in FIG. 6, has a V-shaped ceiling portion 84 and a V-shaped floor portion 86 spaced from the ceiling portion. The ceiling portion 84 is connected to the floor portion 86 by a pair of substantially extending planar surface portions 88. Each of the legs of the ceiling portion 84 and the floor portion 86 is disposed at an angle relative to a plane containing one of the layers 240 (FIG. 6) of material defining the body 21.

Material is added to the body base 22 along a lay down direction D1 (FIG. 6) in successive layers 240. The material is added in such a manner to maintain the surface of the inner opening defined by the inner surface 26 and define at least one tortuous flow channel extending between the inner opening surface and the outer surface. The surfaces defining the opening 26 of the trim cage 20 can be manufactured with relatively good precision and accuracy so that it may not require finish machining to precisely fit over the valve plug.

The flow channels 40 are essentially void spaces formed within the unitary body 21 and require no support during manufacture in order to define the flow channels. The tortuous flow channel 40 is comprised of a plurality of sections. Each section of the flow channel is offset relative to an adjacent section in the lay down direction D1. At least a portion of each section extends at an angle relative to direction of additive lay down of at least 45°. The numerous layers are laid down until the desired length of the body 21 and number of flow channels 40 are provided. Material is then added to define the body cap 24 in such a manner to maintain the inner surface and the outer surface to complete the body 21 of the trim cage 20.

The lay down of each layer 240 is illustrated in FIG. 6 as forming the ceiling portions 84. The same concept for forming the ceiling portion 84 is used in forming the floor portions 86 and will suffice to describe both. Each successive layer overlaps the previous layer by a predetermined relatively small dimension, such as less than half of the diameter of the powdered particle used, to define the angled planar surface of the leg of the ceiling portion 84 by forming a series of relatively small "steps". Each layer can be laid down with a thickness in the range of about 20 to 200 microns (0.0008 to 0.008 inch) depending on the material, size of powder and laser energy applied. Of course, it is to be appreciated that different thicknesses, and specifically thinner, finer layers may be employed.

This lay down of successive layers 240 also allows the definition of subsequent overlapping surfaces to define curved or linear surfaces, such as those shown in FIGS. 7 and 8, that are disposed at an angle to the longitudinal central axis A. The direction of material lay down is preferably parallel to the longitudinal central axis A. At least a portion of each section extends at a suitable acute angle relative to direction of additive lay down and preferably at least 45°. Thus, no internal support is needed to define the void spaces of the flow channels 40.

The material that the trim cage 20 is made from is selected from the group of metal powders comprising: stainless steel based powders; nickel & cobalt based powders; iron based powders; titanium based powders; aluminum based powders; and combinations thereof. It will be apparent that any suitable material may be employed according to this aspect.

A one-piece unitary body 21 is, therefore, provided with flow channels 40 formed by the body 21 manufacturing process. The flow channels 40 are formed without the need for support of surfaces not extending in the direction of material lay down. The inner surface 26 of the trim cage 20 is precision fit to the plug size by the manufacturing process and requires minimal or no further machining to provide the desired inside diameter dimension and surface finish.

An alternate aspect of the manufacturing process is illustrated in FIG. 12. The direction of material lay down D2 may be orthogonal relative to the longitudinal central axis A, as illustrated in FIG. 12. Material can be added to the body 21 along the lay down direction D2 (FIG. 12) that is not oriented along the axis of the body. The material is added in such a manner to maintain the inner surface 26 and define the tortuous flow channels 40 extending between the inner surface 26 and the outer surface 28. The flow channels 40 are essentially void spaces within the unitary body 21 and require no support to define the flow channels. The flow channel 40 is formed by material additive layer process in the lay down direction D2. Each surface 208 extends at an angle relative to direction of additive lay down D2 of at least 45°. The angled surfaces 208 are formed by the layer additive process as described above for ceiling portions 84 and floor portions 86 illustrated in FIG. 6. That is, the surfaces 208 are created by overlapping successive layers of material to create a series of relatively small "steps."

The trim cage 20 offers numerous advantages over heretofore known plate type of cages. For example, little or no machining of the inner opening is required. There is no need to be concerned about the flatness of a plate or to machine flow channels in plates. There is no need to stack plates or to align them. There is no brazing required. Thus, the quality problems that ensue from the difficult brazing process are avoided. The height of a flow channel can be larger than width and more than the thickness of plates that were used in previously known cages. Also, such can provide for some additional/different advantages. For example, a stack can have a number of plates (e.g., one hundred plates) and the natural tolerance of commercially available plate stock would lead to design with many more plates than necessary to ensure we have enough stack height. This frequently results in having to machine off some material (e.g., an inch) from top and bottom caps that are brazed onto the stack. This present additive technique can help remove this situation and such save time and money.

From the above description of at least one aspect of the invention, those skilled in the art will perceive improvements, changes and modifications. Such improvements, changes and modifications within the skill of the art are intended to be covered by the appended claims.

Certain terminology is used herein for purposes of reference only, and thus is not intended to be limiting. For example, terms such as "upper", "lower", "above", and "below" refer to directions in the drawings to which reference is made. Terms such as "left", "right", "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary aspects, the articles "a", "an" and "the" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

Although the description has been shown and described with respect to one or more embodiments, aspects, applications or implementations, it will occur to those skilled in the art based upon a reading and understanding of this description and the drawings that equivalent alterations and modifications may be made without detracting from the spirit and scope of the embodiments, aspects or implementations in the description. The description and claims are intended to include all such modifications and alterations.

What is claimed is:

1. A valve component for controlling fluid flow, the valve component comprising:
   a body having a first surface and a second surface;
   at least one tortuous flow channel extending between the first surface and the second surface, the flow channel configured to have a plurality of sections and a plurality of direction changes within the extent between the first surface and the second surface, each section of the flow channel at least partially defined by a floor portion and a ceiling portion;
   the body being formed as one-piece by additive manufacturing to concurrently define the flow channel as a void space; and
   wherein, for each section of the flow channel, each of the floor portion and ceiling portion being disposed at an acute angle relative to a plane containing a layer of material forming the body such that each section of the flow channel has a general chevron cross-sectional shape.

2. The valve component of claim 1, wherein the acute angle for the at least one of the floor portion and ceiling portion is at least 45°.

3. The valve component of claim 1, wherein a cross-sectional flow area of the flow channel increases as the flow channel extends from the first surface to the second surface.

4. The valve component of claim 1, further including at least one planar surface extending between the floor portion and the ceiling portion.

5. The valve component of claim 1, further including a secondary flow channel extending from the flow channel to the second surface.

6. The valve component of claim 1, wherein a height of the flow channel is greater than a width of the flow channel.

7. The valve component of claim 1, further including a plurality of tortuous flow channels extending between the first surface and second surface of the body.

8. The valve component of claim 1, wherein at least one of the floor portion and ceiling portion of the flow channel has a pair of surfaces that intersect at an acute angle, each of the pair of surfaces also being disposed at an acute angle relative to the plane containing the layer of material forming the body.

9. The valve component of claim 1, wherein the tortuous flow channel comprises at least two sections, each section of the flow channel is offset relative to an adjacent section in a direction orthogonal to the plane containing the layer of material forming the body.

10. A trim cage for controlling fluid flow, the trim cage comprising:
- a unitary body having a substantially tubular configuration with a longitudinal central axis, the body having an inner surface and an outer surface;
- at least one tortuous flow channel extending through the body from the inner surface to the outer surface for fluid flow therethrough, the tortuous flow channel configured to have a plurality of sections and a plurality of direction changes within the extent between the inner surface and the outer surface, each section of the flow channel is offset relative to an adjacent section, each section of the flow channel has an axial floor portion and axial ceiling portion; and
- wherein each of the axial floor portion and axial ceiling portion are disposed at an acute angle relative to a plane extending normal to the longitudinal central axis of the body such that each section of the flow channel has a general chevron cross-sectional shape.

11. The trim cage of claim 10 wherein a cross-sectional flow area of the flow channel increases in the direction extending from the inner surface to the outer surface.

12. The trim cage of claim 10, further including at least one axially extending surface between the axial floor portion and axial ceiling portion.

13. The trim cage of claim 10, wherein the body is formed as one-piece by additive manufacturing while concurrently defining the tortuous flow channel.

14. The trim cage of claim 10, further including a plurality of tortuous flow channels extending between the inner surface and outer surface of the body.

15. The trim cage of claim 10, wherein at least one of the axial floor portion and axial ceiling portion of the flow channel has a pair of surfaces that intersect at an acute angle, each of the pair of surfaces being disposed at an angle of at least 45° relative to the plane extending normal to the longitudinal central axis of the body.

* * * * *